United States Patent
Leppinen

(10) Patent No.: US 6,735,186 B1
(45) Date of Patent: May 11, 2004

(54) METHOD AND SYSTEM FOR OPTIMIZING USAGE OF AIR LINK

(75) Inventor: Mika Leppinen, Woburn, MA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/469,859

(22) Filed: Dec. 22, 1999

(51) Int. Cl.[7] ............................................. H04Q 7/24
(52) U.S. Cl. ................. 370/338; 455/426.1; 455/466; 709/227; 709/238
(58) Field of Search ........................... 455/426.1, 466; 370/315, 326, 329, 347, 338, 401, 465, 466, 477; 709/217–218, 225, 227, 238

(56) References Cited

U.S. PATENT DOCUMENTS

| | | | |
|---|---|---|---|
| 5,101,406 A | 3/1992 | Messenger | 370/94.1 |
| 5,293,379 A * | 3/1994 | Carr | 370/474 |
| 5,649,186 A | 7/1997 | Ferguson | 395/610 |
| 5,892,919 A | 4/1999 | Nielsen | 385/200.58 |
| 5,966,652 A | 10/1999 | Coad et al. | 455/412 |
| 6,002,719 A * | 12/1999 | Parvulescu et al. | 375/240 |
| 6,088,594 A * | 7/2000 | Kingdon et al. | 455/457 |
| 6,112,099 A * | 8/2000 | Ketola | 455/466 |
| 6,122,661 A | 9/2000 | Stedman et al. | 709/217 |
| H1895 H | 10/2000 | Hoffpauir et al. | 455/433 |
| 6,151,627 A * | 11/2000 | McBride et al. | 709/224 |
| 6,185,598 B1 | 2/2001 | Farber et al. | 709/200 |
| 6,334,056 B1 | 12/2001 | Holmes et al. | 455/445 |
| 6,334,152 B1 | 12/2001 | Mannings et al. | 709/227 |
| 6,356,934 B1 | 3/2002 | Delph | 709/204 |
| 6,393,014 B1 | 5/2002 | Daly et al. | 370/352 |
| 6,397,259 B1 * | 5/2002 | Lincke et al. | 709/236 |
| 6,434,168 B1 * | 8/2002 | Kari | 370/521 |
| 6,549,773 B1 * | 4/2003 | Linden et al. | 455/426.1 |
| 6,584,321 B1 * | 6/2003 | Coan et al. | 455/466 |

FOREIGN PATENT DOCUMENTS

| | | | |
|---|---|---|---|
| EP | 0 811 939 A2 | 12/1997 | G06F/17/30 |
| WO | WO 97/48212 | 12/1997 | |
| WO | WO 99/40514 | 8/1999 | G06F/9/46 |

OTHER PUBLICATIONS

"WAP Architecture" WAP Architecture Version 12 Jul. 2001.*
Jens Michael, "WebOnAir Macht Dem Mobilen Internet Beine", vol. 52, No. 8, 1999, pp. 45–46.
Java Virtual Machine Byte Code Emulation, XP-000888634, Disclosed by International Business Machines Corporation.
"WAP Architecture" WAP Architecture Version 30 Apr. 1998, XX, XX, Apr. 26, 1999, pp. 1–20 XP002101098, p. 12, line 4–page 13, line 17 figures 2, 3.
Berners Lee T: "Hypertext Transfer Protacal—HTTP/1.1 RFC 2616" IETF Network Working Group, Jun. 1999, XP002159137 p. 40, Line 4–P 42, Line 14.
"Creating graphics for the Web: compresion Basics" http://www.widearea.co.uk/designer/compress.html, Dec. 16, 1999.
"FLZ Data Compression" http://www.cs.pdx.edu/~idr/unbzip2.cgi?compression/flz.html.bz2. Dec. 16, 1999.

* cited by examiner

*Primary Examiner*—Willaim Trost
*Assistant Examiner*—Sharad Rampuria
(74) *Attorney, Agent, or Firm*—Cohen, Pontani, Lieberman & Pavane

(57) ABSTRACT

A method of optimizing the amount of data transmitted between a mobile station and a gateway. Data are transmitted from a web server in accordance with a first protocol to the gateway in response to a request from the mobile station. The gateway encodes the data from the web server into bytecodes in accordance with a second protocol by the gateway. The bytecodes are compressed using a compression algorithm and then transmitted to the mobile station. The mobile station receives the compressed bytecodes and decompresses the compressed bytecodes using a decompression algorithm. The decompressed bytecodes are decoded in accordance with the second protocol for presentation to a user.

27 Claims, 1 Drawing Sheet

METHOD AND SYSTEM FOR OPTIMIZING USAGE OF AIR LINK

BACKGROUND OF THE INVENTION

1. Field of the Invention

The present invention relates to wireless communication systems and, more particularly, to a system and method of optimizing data transmission between a gateway and a mobile station.

2. Description of the Related Art

Remote communication with individuals has become increasingly important in a mobile society. Early versions of wireless devices transmitted a signal to a paging device worn by the user. The paging device did little more than provide a beep indicating that a message had been sent to the user. The user must then call a telephone number to receive the actual message. These early paging devices were replaced with text messaging devices that include a small display that permits the transmission of a text message, such as the message sender's telephone number. While the text messaging device provided additional data to the user, the user still had to use a separate telephone to contact the message sender, or to take action in accordance with the message.

With the advent of wireless communications networks, a user can simply call any telephone number on his cellular phone from virtually anywhere and once connected, speak directly to another party. Some cellular "phones" are even capable of transmitting and receiving data through an air link. These "phones," more properly named as mobile stations, operate as mobile terminals have features similar to those of desktop computer terminals, features such as, for example, the ability to access stock quotes, weather, and e-mail messages through the Internet. Typical mobile stations, however, have less powerful processors and memories than those of desktop terminals because they have severe size and power consumption constraints. The amount of data and the reliability of data transmission are also limited by the available spectrum, i.e., the radio resources allotted to the mobile station.

The Wireless Application Protocol (WAP) has been developed to deal with these severe constraints imposed on the mobile stations. In accordance with WAP, resources retrieved from the Internet are encoded by a gateway server into a compact binary format (e.g., Wireless Markup Language (WML) or WMLScript) and the mobile station, more particularly, the user agent of the mobile station decodes the bytecodes for presentation to the user. However, the encoding methods defined by WAP do not adequately reduce the amount of data transmitted to the mobile stations, thereby unnecessarily consuming valuable radio resources in the wireless network.

Accordingly, there is a need for a system and a method that facilitates more effective usage of the radio resources while a mobile station communicates with a web server.

SUMMARY OF THE INVENTION

An object of the present invention is to provide a low-cost method and system for minimizing the data transmitted between a mobile station and a web or origin server.

According to an aspect of the invention, prior to transmission to a mobile station, data is first encoded according to the Wireless Application Protocol and then compressed using a conventional compression algorithm. Upon receiving the compressed data, the mobile station decompresses the compressed data and then decodes the decompressed data according to the Wireless Application Protocol for presentation to a user.

According to another aspect of the invention, the User Agent Profile (UAProf) includes data indicating the extended decompression capabilities of the mobile station and is sent to the gateway server. If the mobile station supports decompression, the WAP encoded data is compressed prior to their transmission to the mobile station. If not, the WAP encoded data is transmitted without compression.

In one embodiment, data is transmitted from a web server in accordance with a first protocol to a gateway in response to a request from a mobile station. The gateway encodes the data from the web server into bytecodes in accordance with a second protocol and compresses the bytecodes using a compression algorithm. The compressed bytecodes are then transmitted to the mobile station. The mobile station receives the compressed bytecodes and decompresses the compressed bytecodes using a decompression algorithm. The decompressed bytecodes are decoded in accordance with the second protocol for presentation to a user.

In another embodiment, data is transmitted from a web server in accordance with a first protocol to the gateway in response to a request from the mobile station. The gateway encodes the data from the web server into bytecodes in accordance with a second protocol. The encoded data are sent to the mobile station if the bytecodes are of a size less than a predetermined size. The gateway compresses the bytecodes using a compression algorithm when the bytecodes are of a size at least as great as the predetermined size. The compressed bytecodes are transmitted to the mobile station. The mobile station receives the compressed bytecodes and decompresses the compressed bytecodes using a decompression algorithm. The decompressed bytecodes are then decoded in accordance with the second protocol.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference numerals denote similar elements.

DETAILED DESCRIPTION OF THE PRESENTLY PREFERRED EMBODIMENTS

Figure 1:
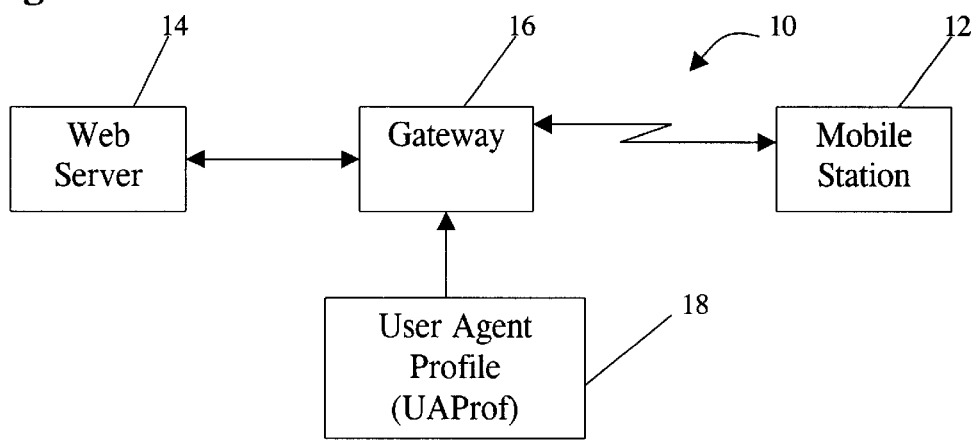
FIG. 1 diagrammatically illustrates an embodiment of a wireless data transmission system of the present invention.

FIG. 1 illustrates a wireless data transmission system 10 constructed in accordance with an embodiment of the present invention. The system 10 includes a mobile station 12, a web server 14 connected to a wide-area network such as the Internet, and a gateway 16. The mobile station 12 may, for example, be a wireless phone, a personal digital assistant (PDA), a palm-sized personal computer or the like configured to commnunicate with a wireless communication network and the wide-area network. Data transmitted between the mobile station 12 and the wireless communication network is encoded according to, for example, the Wireless Application Protocol (WAP). The mobile station 12 includes a user agent for requesting resources from the web server 14. The web server 14 (also known as an origin server) provides clients (e.g., the mobile station 12) with the requested resources at the web server 14 or another server in accordance with the World Wide Web protocols including the HyperText Transfer Protocol (HTTP).

The gateway 16, connected to the wide area network and the wireless communication network, functions as a go-between for the web server 14 and the mobile station 12. For example, it encodes the requested resources (e.g., a HyperText Markup Language document) from the web server 14 from one format into another format (e.g., Wireless Markup Language (WML)) that is tailored for the wireless network. The gateway 16 also translates requests from the WAP protocol stack (including, for example, Wireless Session Protocol) to the World Wide Web (WWW) protocol stack (including, for example, HTTP) and vice versa. These gateway functions may reside in a stand-alone server or distributed among several servers (including a proxy or origin server). Thus, for example, a WAP gateway server may transmit or tunnel packets of data to a WAP proxy for encryption and/or decryption.

It has been discovered that encoded data, formatted as bytecodes (i.e., in binary format) for transmission between the gateway 16 and the mobile station 12, exhibit numerous repeating or redundant sequences, and thus can be compressed effectively. For example, the compression of bytecodes of 1000 bytes or more could result in about 40% to about 60% reduction in bits. This reduction of encoded data (including WML, WMLScript, WBMP bytecodes) will significantly increase the availability of radio resources in the wireless communication network.

Preferably, the mobile station 12 at the opening of a Wireless Session Protocol (WSP) session, informs the gateway 16 of its capabilities, particularly, its extended capabilities in compressing and/or decompressing WAP encoded data. Such information may be included in the user agent profile (UAProf) information element 18 transmitted to the gateway 16. The UAProf 18 may be configured to include information indicating whether the mobile station's user agent is capable of performing compression and/or decompression on WAP encoded data, and if so, the particular compression/decompression technique (e.g., LZ77, FLZ, ZIP, or ARC) supported by the user agent. In a preferred embodiment, the compression/decompression technique employs the Lempel-Ziv-Welsh technique, a lossless compression technique (developed by J. Ziv and A. Lempel, and later refined by T. Welsh). The LZW technique is commonly used in the Graphics Interchange Format (GIF). It is contemplated that lossy techniques may also be employed.

Figure 2:
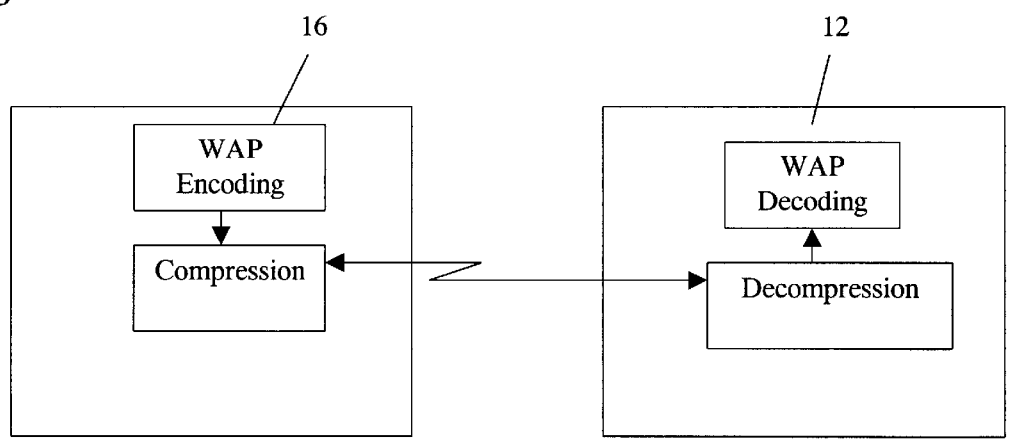
FIG. 2 diagrammatically illustrates the inventive steps to be performed by the embodiment of FIG. 1.

FIG. 2 diagrammatically illustrates a particularly preferred embodiment of the inventive method. Since the amount of data transmitted from the gateway 16 to the mobile station 12 is typically greater than that transmitted in the opposite direction, i.e., from the mobile station 12 to the gateway 16, the gateway 16 preferably encodes the data into bytecodes (such as, for example, WML bytecodes, WMLScript bytecodes, and WBMP bytecodes). (The amount of data transmitted from the gateway 16 to the mobile station 12 is greater than that transmitted in the opposite direction because resources are downloaded to the user rather than the other way around.) The gateway 16 may selectively compress the bytecodes such that only bytecodes of at least a predetermined size (e.g., about 500 bytes) are compressed. The predetermined size may be selected so as to provide a desired compression ratio. After compressing the bytecodes, the gateway 16 transmits the compressed bytecodes to the mobile station 12. The mobile station 12 receives the compressed bytecodes from the gateway 16 and decompresses the compressed bytecodes into a WAP format. The decompressed bytecodes are then decoded according to the WAP protocol for presentation to a user. It is contemplated that the mobile station 12 stores the downloaded data from the gateway 16 in compressed format, in cache or other memory devices, so as to increase the storage capacity of the mobile station 12.

In another embodiment, the mobile station 12 compresses encoded data prior to transmission to the gateway 16 and that the gateway 16 decompresses the compressed data from the mobile station 12 and encodes the decompressed data into another format for transmission to the web server 14 or another mobile station. Similar to the gateway, the mobile station 12 may also selectively compress encoded data so that only bytecodes having a size at least as great as a predetermined size are compressed and bytecodes having a size less than the predetermined size are not compressed prior to transmission to the gateway 16.

It is also contemplated that the compression/decompression techn ique may be incorporated in the WAP encoding/decoding process so as to eliminate the extra step of compressing the WAP encoded data prior to transmission or decompressing prior to decoding the WAP encoded data.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for increasing the availability of radio resources in communication between a mobile station and a gateway, comprising in sequence the steps of:

(a) transmitting data from a web server in accordance with a first protocol to the gateway in response to a request from the mobile station;

(b) translating the data into a second protocol and encoding the data which is formatted in the second protocol into bytecodes by the gateway;

(c) compressing the bytecodes using a compression algorithm;

(d) transmitting the compressed bytecodes to the mobile station;

(e) receiving the compressed bytecodes by the mobile station;

(f) decompressing by the mobile station the compressed bytecodes using a decompression algorithm; and (g) decoding by the mobile station the decompressed bytecodes in accordance with the second protocol.

2. The method of claim 1, wherein the first protocol includes HypterText Transfer Protocol.

3. The method of claim 1, wherein the second protocol includes Wireless Application Protocol.

4. The method of claim 1, wherein the compression algorithm is performed in accordance with Lempel-Ziv-Welsh compression algorithm.

5. The method of claim 1, wherein the decompression algorithm is performed in accordance with Lempel-Ziv-Welsh decompression algorithm.

6. A method for increasing the availability of radio resources in communication between a mobile station and a gateway, comprising in sequence the steps of:

(a) transmitting data from a web server in accordance with a first-protocol to the gateway in response to a request from the mobile station;

(b) translating the data into a second protocol and encoding the data which is formatted in the second protocol into bytecodes by the gateway;

(c) sending the encoded data to the mobile station when the bytecodes has a size less than a predetermined size;

(d) compressing by the gateway the bytecodes using a compression algorithm when the bytecodes has a size at least as great as the predetermined size;

(e) transmitting the compressed bytecodes to the mobile station;

(f) receiving the compressed bytecodes by the mobile station;

(g) decompressing by the mobile station the compressed bytecodes using a decompression algorithm; and (h) decoding by the mobile station the decompressed bytecodes in accordance with the second protocol.

7. The method of claim 6, wherein the first protocol includes HypterText Transfer Protocol.

8. The method of claim 6, wherein the second protocol includes Wireless Application Protocol.

9. The method of claim 6, wherein the compression algorithm is performed in accordance with Lempel-Ziv-Welsh compression algorithm.

10. The method of claim 6, wherein the decompression algorithm is performed in accordance with Lempel-Ziv-Welsh decompression algorithm.

11. A method for increasing the availability of radio resources in communication between a mobile station and a gateway, comprising in sequence the steps of:

(a) encoding by the mobile station data which is formatted according to a first protocol into bytecodes for transmission to the gateway;

(b) compressing by the mobile station the bytecodes using a compression algorithm;

(c) transmitting the compressed bytecodes to the gateway;

(d) receiving the compressed bytecodes by the gateway;

(e) decompressing by the gateway the compressed bytecodes using a decompression algorithm; and (f) decoding by the gateway the decompressed bytecodes in accordance with the first protocol.

12. The method of claim 11, wherein the first protocol includes Wireless Application Protocol.

13. The method of claim 11, further comprising the step of (g) encoding the decoded bytecodes from step (f) in accordance with a second protocol.

14. The method of claim 13, wherein the second protocol includes HyperText Transfer Protocol.

15. The method of claim 11, wherein the compression algorithm is performed in accordance with Lempel-Ziv-Welsh compression algorithm.

16. The method of claim 11, wherein the decompression algorithm is performed in accordance with Lempel-Ziv-Welsh decompression algorithm.

17. A method for increasing the availability of radio resources in communication between a mobile station and a gateway, comprising in sequence the steps of:

(a) encoding by the mobile station data which is formatted according to a first protocol into bytecodes for transmission to the gateway;

(b) sending the encoded data to the gateway when the bytecodes are of a size less than a predetermined size;

(c) compressing by the mobile :station the bytecodes using a compression algorithm when the bytecodes are of a size at least as great as the predetermined size;

(d) transmitting the compressed bytecodes to the gateway;

(e) receiving the compressed bytecodes by the gateway;

(f) decompressing by the gateway the compressed bytecodes using a decompression algorithm; and (g) decoding by the gateway the decompressed bytecodes in accordance with the first protocol.

18. The method of claim 17, wherein the first protocol includes Wireless Application Protocol.

19. The method of claim 17, further comprising the step of (h) encoding the decoded bytecodes from step (g) in accordance with a second protocol.

20. The method of claim 19, wherein the second protocol includes HyperText Transfer Protocol.

21. The method of claim 17, wherein the compression algorithm is performed in accordance with Lempel-Ziv-Welsh compression algorithm.

22. The method of claim 17, wherein the decompression algorithm is performed in accordance with Lempel-Ziv-Welsh decompression algorithm.

23. A system for increasing the availability of radio resources in communication between a mobile station and a gateway, comprising:

a web server connected to a wide-area network for communicating data encoded in accordance with a first protocol;

a mobile station connected to a wireless communication network for communicating data formatted according to a second protocol and encoded into bytecodes, said mobile station including a user agent for requesting resources from said web server and means for compressing and decompressing the bytecodes; and a gateway connected to the wireless communication network and the wide-area network for enabling communication between said web server and said mobile station and having means for translating between said first and second protocols, means for encoding the data formatted according to the second protocol into bytecodes, and means for compressing and decompressing the bytecodes of the second protocol.

24. The system of claim 23, wherein the first protocol includes HypterText Transfer Protocol.

25. The system of claim 23, wherein the second protocol includes Wireless Application Protocol.

26. The system of claim 23, wherein the compression algorithm is performed in accordance with Lempel-Ziv-Welsh compression algorithm.

27. The system of claim 23, wherein the decompression algorithm is performed in accordance with Lempel-Ziv-Welsh decompression algorithm.

* * * * *